(12) United States Patent
Smith, III

(10) Patent No.: US 7,083,201 B2
(45) Date of Patent: Aug. 1, 2006

(54) JUNCTION PLATE ASSEMBLY FOR UNDERSEA HYDRAULIC COUPLINGS

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 233 days.

(21) Appl. No.: 10/806,661

(22) Filed: Mar. 23, 2004

(65) Prior Publication Data

US 2005/0212286 A1    Sep. 29, 2005

(51) Int. Cl.
*F16L 39/00* (2006.01)

(52) U.S. Cl. .................. 285/124.3; 285/312; 285/920; 285/38; 285/394

(58) Field of Classification Search ............. 285/124.3, 285/312, 920, 38, 314, 124.2, 394
See application file for complete search history.

(56) References Cited

U.S. PATENT DOCUMENTS

| | | | |
|---|---|---|---|
| 2,129,704 A | 9/1938 | Meyer | |
| 3,201,151 A | 8/1965 | Westveer | |
| 3,214,195 A | 10/1965 | Zahuranec et al. | 385/124.1 |
| 3,217,746 A | 11/1965 | Voisine | |
| 3,527,480 A | 9/1970 | Larson | |
| 3,551,005 A | 12/1970 | Brun | |
| 3,625,251 A | 12/1971 | Nelson | |
| 3,710,296 A | 1/1973 | Urani | 337/188 |
| 3,918,485 A | 11/1975 | Weber et al. | |
| 3,960,393 A | 6/1976 | Hosokawa et al. | 285/124.4 |
| 4,076,279 A | 2/1978 | Klotz et al. | |
| 4,080,025 A | 3/1978 | Garnier et al. | 285/27 |
| 4,089,549 A | 5/1978 | Vyse et al. | |
| 4,426,104 A | 1/1984 | Hazelrigg | |
| 4,453,566 A | 6/1984 | Henderson, Jr. et al. | |
| 4,460,156 A | 7/1984 | Hazelrigg et al. | |
| 4,597,413 A | 7/1986 | Buseth | |
| 4,637,470 A | 1/1987 | Weathers et al. | |
| 4,666,187 A | 5/1987 | Koot | |
| 4,915,419 A | 4/1990 | Smith, III | |
| 4,925,154 A | 5/1990 | Baker | |
| 5,265,980 A | 11/1993 | Lugo et al. | 405/169 |
| 5,342,098 A | 8/1994 | Wilkins | |
| 5,829,480 A | 11/1998 | Smith, III | |
| 5,899,228 A | 5/1999 | Smith, III | |
| 5,920,934 A | 7/1999 | Hannagan et al. | 285/124.1 |
| 6,017,065 A | 1/2000 | Hellesoe | 285/124.1 |
| 6,106,026 A | 8/2000 | Smith, III | |
| 6,173,853 B1 | 1/2001 | Luch | |
| 6,471,250 B1 | 10/2002 | Smith, III | 285/124.1 |

*Primary Examiner*—David Bochna
(74) *Attorney, Agent, or Firm*—Wong, Cabello, Lutsch, Rutherford & Brucculeri, LLP

(57) ABSTRACT

An apparatus for simultaneously moving male and female coupling members attached to manifold or junction plates together or apart includes sloped cam surfaces on the first or rear junction plate, a central shaft having cam followers that move up the sloped cam surface to urge the two junction plates together, and thereby connect male and female coupling members and corresponding sloped cam surfaces on the opposite side of the first junction plate with cam followers that move across the sloped cam surface to disconnect the coupling members.

16 Claims, 3 Drawing Sheets

JUNCTION PLATE ASSEMBLY FOR UNDERSEA HYDRAULIC COUPLINGS

BACKGROUND OF THE INVENTION

1. Field of the Invention

This invention concerns hydraulic couplings used in subsea oil and gas well applications. More particularly, it relates to junction plates used to simultaneously mate a plurality of male and female hydraulic couplings.

2. Description of the Related Art

Offshore oil and gas exploration and production involves the placement of numerous valves and safety equipment on or near the sea floor. The collection of such equipment on a well is often referred to as a "tree." Frequently, these devices are hydraulically actuated from a remote location such as a production platform. A bundle of hydraulic lines, known as an umbilical cable, is routed from a control panel on the platform to the subsea tree. For ease of assembly and maintenance, subsea hydraulic couplings are typically provided for joining the hydraulic lines to the tree. Examples of such subsea hydraulic couplings are disclosed in U.S. Pat. No. 6,626,207 and U.S. Pat. No. 6,375,153.

Because such couplings must be mated underwater by divers or remotely operated vehicles ("ROVs"), it has been found that the mating process may be expedited by placing a plurality of couplings on opposing junction plates. The junction plates hold the couplings in position and are provided with means for securing the two plates in proximity one to another so as to maintain the individual couplings in a connected condition. Since the hydraulic lines may be pressurized with hydraulic fluid at or about 17,500 psi, the junction plates must be able to withstand the force of the hydraulic fluid acting on the male members as they are inserted into the receiving chambers of the female members and the poppet valves open to allow the flow of hydraulic fluid. It is accordingly necessary to provide some means of mechanical advantage to bring the plates into the fully coupled position.

Male or female couplings may be provided on either plate, but it is typical to locate the male couplings on the fixed plate and the female couplings on the removable plate because the female couplings most often contain the sealing elements and it facilitates the replacement of those sealing elements by having them on a recoverable device—i.e., the plate holding the female members may be brought to the surface for maintenance operations.

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling.

The male member includes a cylindrical body with a probe section approximately equal to the diameter of the female member bore, and a connection at its other end to facilitate connection to hydraulic lines. When the probe section of the male member is inserted into the bore of the female member, according to various embodiments of the device, fluid flow is established between the male and female members.

A male member and female member are generally connected to opposing junction plates of a manifold and are held together by bolts or hydraulic members attached to the plates. The male member is commonly attached to one junction or manifold plate, while the female member is attached to an opposing plate so as to face the male member and align with it. The male and female members may be attached to the junction plates or manifold plates using various means, such as set screws or threads. Techniques for attaching the members to such plates are well known to those skilled in the art.

Typically, several subsea hydraulic connectors are grouped together on each junction or manifold plate. For example, two or more coupling members may be attached to each opposing plate. In the subsea environment, a diver or remotely operated vehicle is used to connect the opposing plates together, and thereby connect the opposing coupling members on each of the plates. The coupling members are typically simultaneously connected and the opposing plates are locked together.

High separational forces are transferred to the opposing junction plates, due to the separational forces of the high pressure hydraulic fluid in each coupling member. In many cases, the plates must be relatively thick and heavy in order to withstand high separational forces. The plates are typically stainless steel and between one and one and one-half inches in thickness.

The prior art describes various means for joining two junction plates. For example, U.S. Pat. No. 5,265,980 describes a junction plate assembly for a subsea structure having a connector shaft with external acme threads which mates with an internally threaded second junction plate. A handle is connected to an opposite end of the shaft for rotating the shaft by hand. Alternatively, the shaft may be equipped with a connection for an ROV.

U.S. Pat. No. 4,915,419 to Robert E. Smith III relates to a sliding lock plate for locking together simultaneously male and female coupling members on opposing junction plates. Various other locking devices have been used or proposed to lock together the male and female coupling members attached to junction plates. These locking devices lock the coupling members together after the male end coupling members are fully engaged, and do not assist in bringing the male and female members together into full engagement before locking. In many cases, substantial axial forces are needed to bring all the male coupling members on a junction plate into full engagement with the female coupling members on the opposing junction plate. Hydraulic systems at subsea depths are subject to a number of different forces tending to inhibit the connection of male and female coupling members. For example, subsea pressures at significant ocean depths, high hydraulic pressure in the system, and mechanical forces required to open valves and connect junction plates are among the factors of concern. A combination of these forces may result in difficulty simultaneously engaging the male and female coupling members on opposing junction plates, and also result in substantial separational forces after the coupling members are connected.

Attempts have been made to simultaneously bring the junction plates together, including threaded devices. However, threaded connections have the disadvantages of marine growth buildup in the threads and galling of the threads. Moreover, threaded junction plate connectors typically require multiple turns of the threaded member in order to bring the two junction plates into the fully mated position. This requires time to accomplish and during this time the hydraulic couplings are not fully made up. This presents the opportunity for fluid loss or sea water entry. Another alternative for bringing together subsea hydraulic connectors is lock sleeves. However, lock sleeves are relatively heavy and bulky, which is undesirable in the subsea environment. Other problems are caused by a buildup of silt, ocean debris and marine growth in the lock sleeves. Typically, the lock sleeve systems includes lock sleeves connected to a plate interposed between the male and female junction plates. As the intermediate plate is pulled back, all of the lock sleeves on the coupling members are simultaneously pulled back and then released. The buildup of silt, ocean debris and marine growth may result in jamming the lock sleeves and especially the locking balls.

U.S. Pat. No. 6,471,250 discloses a junction plate assembly for undersea hydraulic couplings that uses a sloped cam surface on one of the junction plates and a central shaft having a cam follower that moves up the sloped cam surface to bring the two junction plates together. This apparatus, however, only provides mechanical advantage for bringing the junction plates closer to one another; no mechanical assist is available for separating the plates—i.e., disconnecting the couplings mounted thereon.

Accordingly, a simple and highly reliable mechanism is needed for simultaneously engaging and disengaging male and female coupling members on junction plates in the subsea environment. What is needed is an apparatus which can both make up and disengage hydraulic connections quickly, with minimal friction. The present invention solves this problem.

SUMMARY OF THE INVENTION

The present invention overcomes the above mentioned problems and disadvantages by providing a junction plate or manifold plate assembly for hydraulic coupling members wherein the junction plates are moved together and apart by cams and cam followers attached to a central shaft. One of the junction plates to which coupling members are connected includes opposing sloped cam surfaces. The central shaft extending between the junction plates has cam followers, which may be rollers or bearings. When the central shaft is rotated, a first cam follower moves up a sloped cam surface and a second cam follower moves down a opposing sloped surface. The sloped cam surfaces translate the rotational movement of the central shaft to axial movement to bring the two manifold plates together or apart depending on the direction of rotation of the central shaft. When the engagement cam follower reaches the end of its sloped cam surface, the male and female coupling members are fully engaged. Likewise, when the disengagement cam follower reaches the detent at the end of its sloped cam surface, the male and female coupling members are functionally disengaged and the junction plates can be fully separated, if desired. The rotational movement necessary to bring the junction plates and couplings together or apart may be accomplished manually by a diver using a handle attached to the central shaft or with a remotely operated vehicle at subsea depths. The invention has particular application in deep water where it assists installers in overcoming the great hydrostatic forces encountered at such depths.

BRIEF DESCRIPTION OF THE DRAWINGS

The following drawings form a part of the present specification and are included to further demonstrate certain aspects of the present invention. The invention may be better understood by reference to one or more of these drawings in combination with the detailed description of a specific embodiment presented herein.

FIG. 1b is a cross-sectional view of the junction plate assembly of FIG. 1a.

FIG. 1c is a front plan view of the junction plate assembly of FIG. 1a.

FIG. 2b is a cross-sectional view of the junction plate assembly of FIG. 2a.

FIG. 2c is a front plan view of the junction plate assembly of FIG. 2a.

FIG. 3b is a cross-sectional view of the junction plate assembly of FIG. 3a.

FIG. 3c is a front plan view of the junction plate assembly of FIG. 3a.

DETAILED DESCRIPTION

Figure 1A:
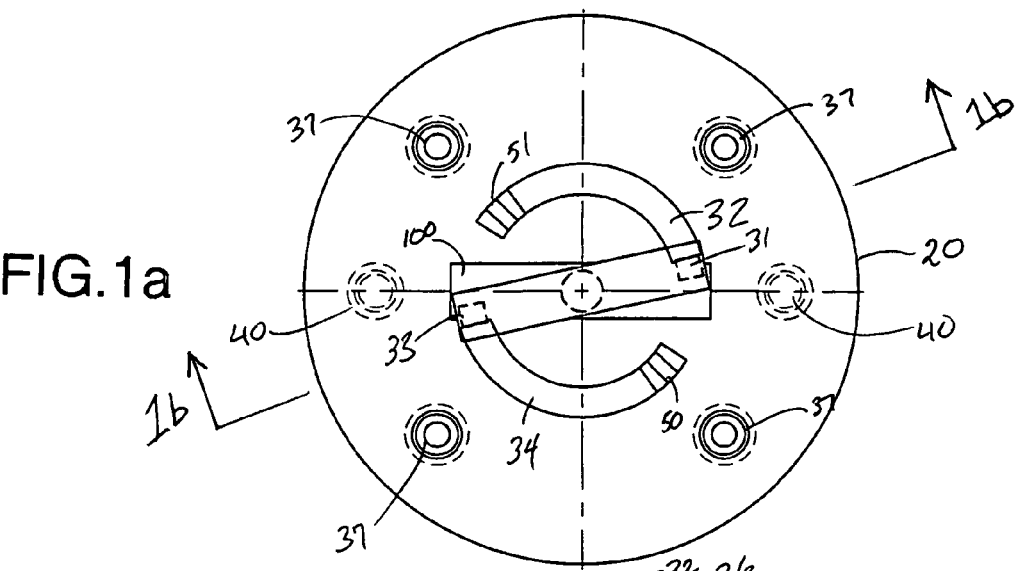
FIG. 1a is a rear plan view of the junction plate assembly according to a preferred embodiment of the present invention showing the engagement cam follower initially engaging the first sloped cam surface and the disengagement cam follower in the detent of the second sloped cam surface.
Figure 1B:
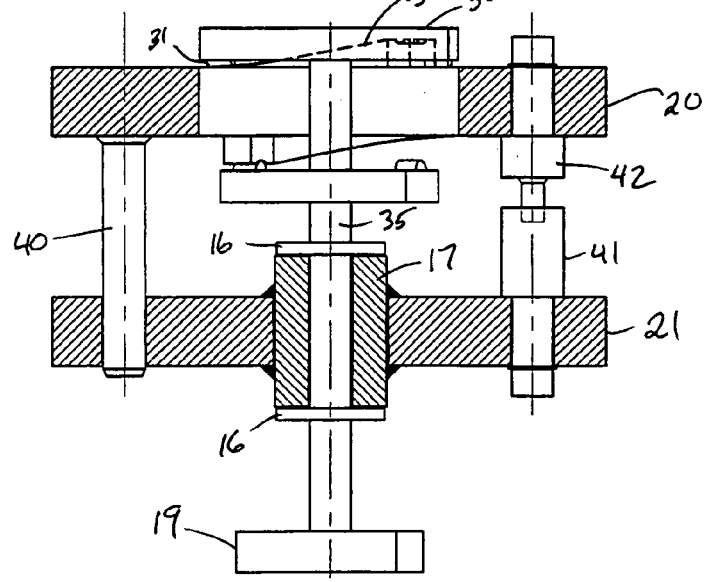
Figure 1C:
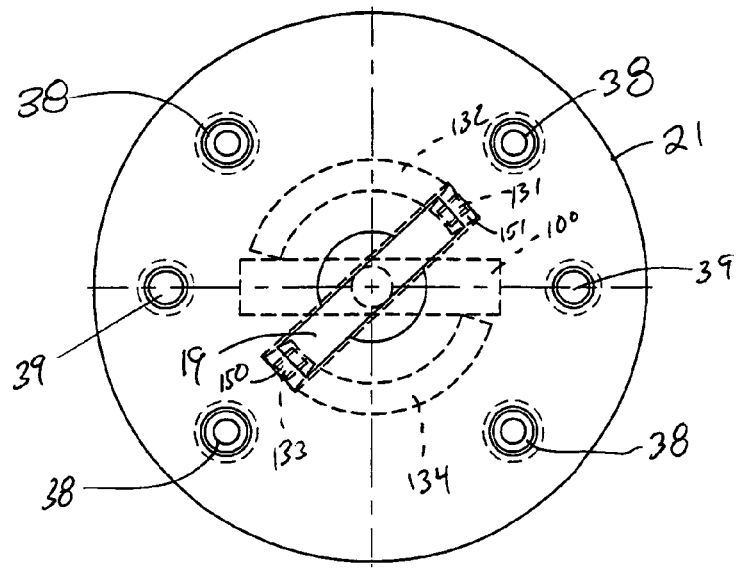

Referring to FIG. 1 of the drawings, a first manifold plate or junction plate 20 is shown having a plurality of cylindrical apertures 37 for connection of male coupling members 42 thereto. Typically, at least two male coupling members are attached to the first junction plate, which is typically the rear junction plate. A male hydraulic line is connected to one end of each male coupling member 42 while the other end of each male coupling member is configured to mate with female coupling member 41 and establish fluid flow therebetween. The second manifold plate or junction plate 21 includes a plurality of cylindrical apertures 38 for connection of female coupling members 41 thereto. In a preferred embodiment, the second manifold plate is the front plate. Various means may be used to connect the male and female coupling members to the junction plates, as is well known in the art.

One or more guidepins 40 are provided on the first manifold plate 20 to align the two manifold plates during engagement of the male and female coupling members. In a preferred embodiment, guidepin 40 is inserted into and through cylindrical aperture 39 in the front manifold plate 21.

First manifold plate 20 also includes slot or aperture 100 sized to permit first rear member 36 to pass through plate 20 when member 36 is aligned therewith by rotating handle 19.

Central shaft 35 extends between the front and rear manifold plates. The central shaft is rotatable on its vertical axis to change the spacing between the front and rear manifold plates. The axis of the central shaft is perpendicular to the face of the first and second manifold plates. One end of the central shaft includes handle 19, which may be used by divers or remotely operated vehicles to turn the central shaft and bring the coupling members into engagement, or to disengage the coupling members.

In a preferred embodiment, the second manifold plate includes sleeve 17 at its center, and the central shaft extends through the sleeve. A pair of flanges 16 on the central shaft prevents axial movement of the central shaft relative to the second manifold plate. One end of the central shaft includes an arm or first rear member 36 perpendicular to the axis of the central shaft. The arm or first rear member includes at least one cam follower attached thereto. In a preferred embodiment, the cam followers are rollers or bearings 31, 33, although other cam followers may be used to move on the sloped cam surface and minimize or reduce friction between the cam followers and sloped cam surface 32.

Sloped engagement cam surfaces 32, 34 extend from a first face of rear manifold plate 20. In the preferred embodiment, there are two sloped engagement cam surfaces, each forming an arc approximately 120 degrees around the central axis of the manifold plate. In a preferred embodiment, each sloped cam surface provides a rise of approximately one-half inch over the 120 degrees rotation about the vertical axis. To engage the couplings, the central shaft is turned so that each cam follower 31, 33 moves up one of the engagement cam surfaces. This urges the first or rear manifold plate 20 closer to the front manifold plate, thereby engaging the male and female coupling members.

Sloped disengagement cam surfaces 132, 134 extend from a second face of rear manifold plate 20. In the preferred embodiment, there are two sloped disengagement cam surfaces, each forming an arc approximately 120 degrees around the central axis of the manifold plate. In a preferred embodiment, each sloped disengagement cam surface provides a rise of approximately one-half inch over the 120 degrees rotation about the vertical axis. To disengage the couplings, the central shaft is turned so that each disengagement cam follower 131, 133 moves up one of the disengagement cam surfaces. This urges the first or rear manifold plate 20 away from the front manifold plate, thereby disengaging the male and female coupling members. Hydraulic couplings may be selected which at least disengage to the extent necessary to fully seat their poppet valves in the axial travel provided by the disengagement cam surface(s).

Figure 2A:
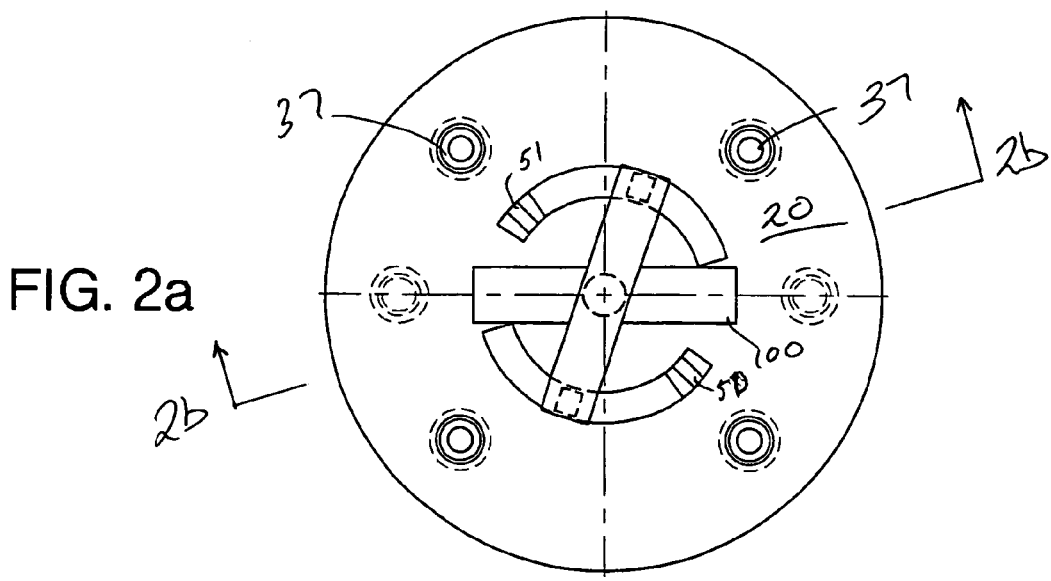
FIG. 2a is a rear plan view of the junction plate assembly according to a preferred embodiment wherein each cam follower has moved approximately half way along its associated sloped cam surface.
Figure 2B:
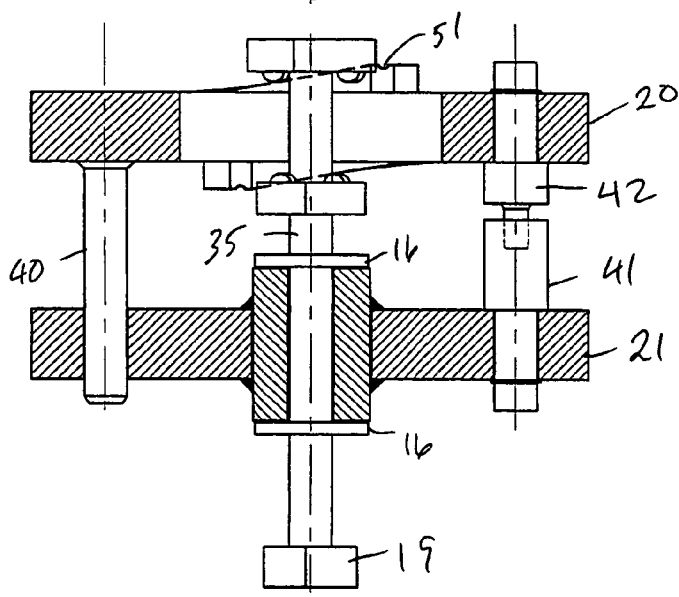
Figure 2C:
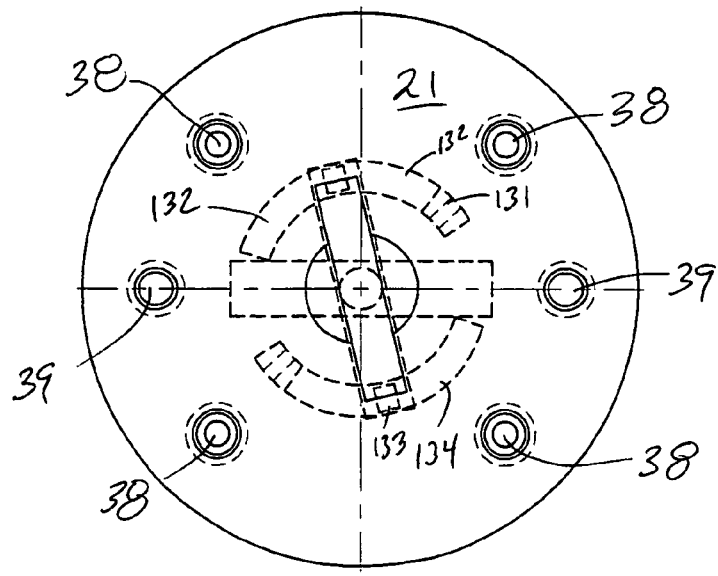
Figure 3A:
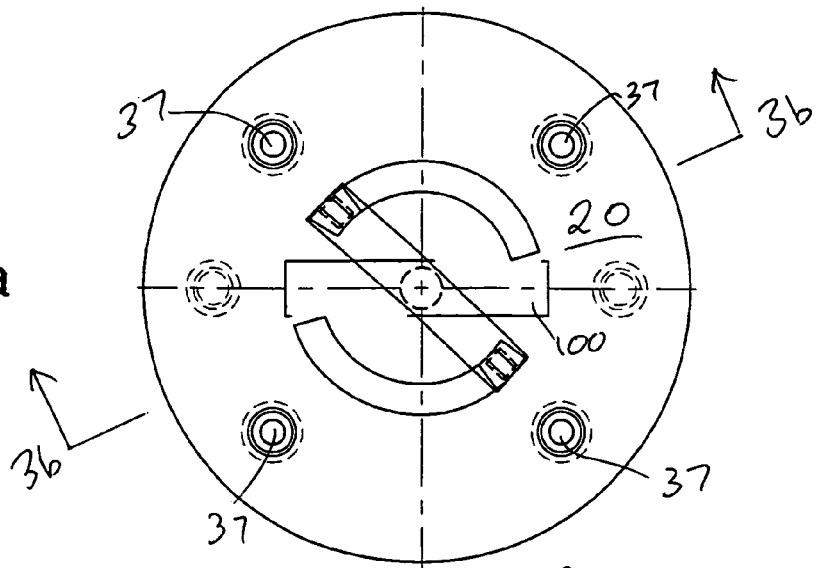
FIG. 3a is a rear plan view of the junction plate assembly according to a preferred embodiment with the engagement cam follower at the end of its associated sloped cam surface and the coupling members fully engaged.
Figure 3B:
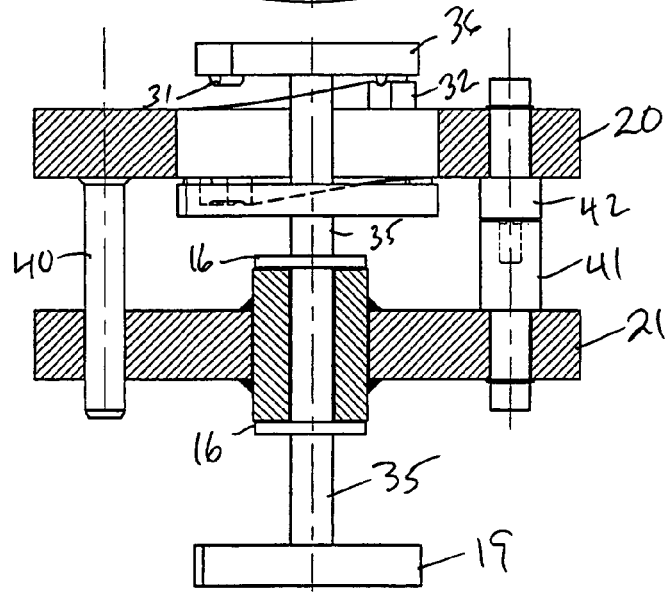
Figure 3C:
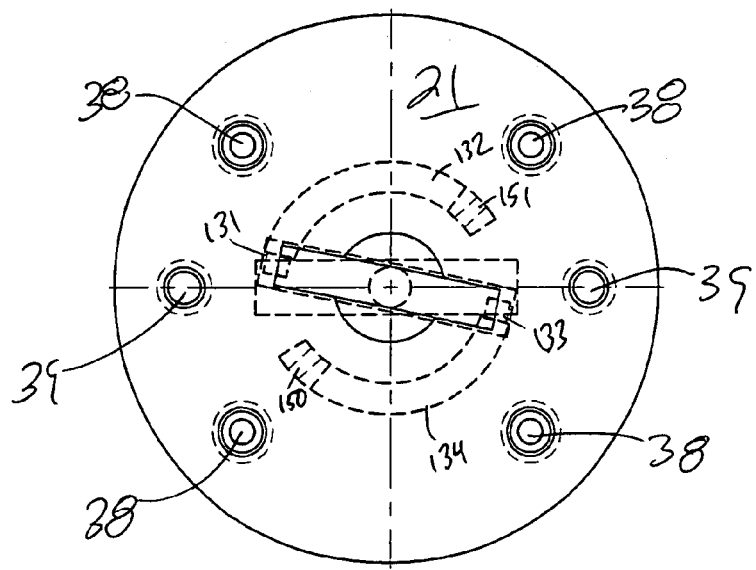

FIG. 2 shows the front and rear manifold plates after the central shaft has been rotated approximately 60 degrees, and FIG. 3 shows the plates after the central shaft has been rotated approximately 120 degrees.

In a preferred embodiment, detents are provided in the sloped cam surfaces at the ends thereof. When the engagement cam followers 31, 33 reach detents 51, 50, further movement of the manifold or junction plates is restrained, and the coupling members are maintained in the fully engaged position, as shown in FIG. 3. When the disengagement cam followers 131, 133 reach detents 151, 150, tactile feedback is transmitted via handle 19 to the diver who can thereby sense that the handle has been rotated sufficiently to disengage the hydraulic couplings.

The present invention may be used either manually or by an ROV to move the faces of the manifold or junction plates together and engage couplings, or to separate the faces of the manifold or junction plates and disengage the couplings. The central shaft rotates and urges the plates together or apart as one or more cam followers moves 120 degrees around the central shaft, bringing the male and female coupling members together or apart. The present invention may be used with undersea hydraulic couplers of the type described in U.S. Patents owned by National Coupling Company, Inc. in Stafford, Tex.

Although the illustrated embodiment shows the invention used with subsea hydraulic couplings, the present invention may be used with many other coupling devices including, but not limited to, electrical connectors, pneumatic connectors, vacuum connections, fiber optic cable connectors, non-hydraulic fluid connectors and the like. Moreover, the application of this invention is not limited to the subsea environment. It can be used to advantage on the surface, as well. In addition to manifold plates, it can be used to axially position any number of devices including, by way of example, control pods, flying leads (i.e., lead to lead), lead-to-manifold and lead-to-tree.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A junction plate assembly for undersea hydraulic couplings comprising:
    (a) a first junction plate having a plurality of male hydraulic coupling members mounted thereto; the first junction plate having at least two sloped cam surfaces on opposing faces thereof;
    (b) a second junction plate in spaced relation to the first junction plate and having a plurality of female coupling members mounted thereto; and
    (c) a central shaft extending between the first and second junction plates, the central shaft rotating on an axis perpendicular to the faces of the first and second junction plates, the central shaft having at least two cam followers proximate one end thereof, the cam followers positioned to ride on the sloped cam surfaces upon rotation of the central shaft to change the spaced relation between the first and second junction plates.

2. The junction plate assembly of claim 1 wherein the sloped cam surfaces form arcs on the faces of the first junction plate.

3. The junction plate assembly of claim 1 wherein the second junction plate includes a central sleeve through which the central shaft extends, and the central shaft has at least one flange to limit axial movement of the central shaft with respect to the second junction plate.

4. The junction plate assembly of claim 1 comprising four sloped cam surfaces and four cam followers.

5. The junction plate assembly of claim 1 wherein the cam followers are attached to arms positioned on the central shaft.

6. The junction plate assembly of claim 1 further comprising at least one guide pin extending from the face of one of the junction plates, and at least one aperture in the other junction plate for insertion of the guide pin therein.

7. An apparatus for varying the spacing between a first manifold plate and a second manifold plate comprising:
    (a) a pair of sloped cam surfaces on a first face of the first manifold plate, each of the sloped cam surfaces forming an arcuate path along the first face of the first manifold plate;
    (b) a pair of sloped cam surfaces on a second face of the first manifold plate, each of the sloped cam surfaces forming an arcuate path along the second face of the first manifold plate;
    (c) a central shaft extending between the first and second manifold plates perpendicular to the face of each manifold plate, the central shaft rotating on its axis perpendicular to the face of each manifold plate, the central shaft having a first arm on one end thereof adjacent the first face of the first manifold plate and a second arm spaced apart from the first arm and adjacent the second face of the first manifold plate, the central shaft having at least one flange adjacent the face of the second manifold plate substantially preventing axial movement of the second manifold plate along the axis of the central shaft; and (d) a pair of cam followers mounted to the first arm on the central shaft and a pair of cam followers mounted to the second arm on the central shaft, the cam followers positioned to ride on the sloped cam surfaces during axial rotation of the central shaft whereby spacing between the faces of the first and second manifold plates may be varied.

8. The apparatus of claim 7 wherein each sloped cam surface forms an arc of about 120 degrees along a face of the first manifold plate.

9. The apparatus of claim 7 further comprising at least one guide pin on one of the manifold plates and at least one aperture in the other manifold plate for insertion of the guide pin therein.

10. The apparatus of claim 7 further comprising a sleeve attached to the second manifold plate through which the central shaft extends, the flange on the central shaft abutting the sleeve to block axial movement of the second manifold plate with respect to the central shaft.

11. The apparatus of claim 7 wherein each of the sloped cam surfaces includes detents adjacent at least one end thereof.

12. An apparatus for engaging or disengaging a plurality of hydraulic coupling members mounted to the faces of opposing first and second junction plates, comprising:

(a) a central shaft having a first end and a second end, the central shaft extending through an aperture in each of the first and second junction plates, the central shaft being perpendicular to the faces of the first and second junction plates and having at least one flange intermediate the central shaft adjacent the face of the second junction plate, the second end of the central shaft including a pair of members perpendicular to the shaft with a cam follower attached to each member; and (b) a sloped cam surface forming an arc along a first face of the first junction plate, an opposing sloped cam surface forming an arc along a second face of the first junction plate, the cam followers configured to ride on the sloped cam surfaces to move the first junction plate axially along the central shaft when the central shaft is rotated while the flange on the central shaft restricts axial movement of the second junction plate with respect to the central shaft.

13. The apparatus of claim 12 further comprising a second pair of cam followers attached to the shaft and a second pair of sloped cam surfaces each forming an arc along a face of the first junction plate.

14. The apparatus of claim 12 wherein the sloped cam surface forms an arc of about 120 degrees.

15. The apparatus of claim 12 further comprising a sleeve on the second junction plate adjacent the flange.

16. The apparatus of claim 12 further comprising a guide pin attached to one of the junction plates and an aperture configured to receive the guide pin on the other junction plate.

* * * * *